No. 762,241. PATENTED JUNE 7, 1904.
H. D. LAYMAN & FLORENCE W. PARPART, (BY MARRIAGE NOW FLORENCE W. LAYMAN).
STREET SWEEPING MACHINE.
APPLICATION FILED JULY 17, 1901.
NO MODEL. 6 SHEETS—SHEET 1.

No. 762,241. PATENTED JUNE 7, 1904.
H. D. LAYMAN & FLORENCE W. PARPART, (BY MARRIAGE NOW FLORENCE W. LAYMAN).
STREET SWEEPING MACHINE.
APPLICATION FILED JULY 17, 1901.
NO MODEL. 6 SHEETS—SHEET 2.

No. 762,241. PATENTED JUNE 7, 1904.
H. D. LAYMAN & FLORENCE W. PARPART, (BY MARRIAGE NOW FLORENCE W. LAYMAN).
STREET SWEEPING MACHINE.
APPLICATION FILED JULY 17, 1901.
NO MODEL. 6 SHEETS—SHEET 3.

Fig. 3.

Witnesses:
Inventors:
Hiram D. Layman &
Florence W. Parpart
By W. J. Duvall
Attorney.

No. 762,241. PATENTED JUNE 7, 1904.
H. D. LAYMAN & FLORENCE W. PARPART, (BY MARRIAGE NOW FLORENCE W. LAYMAN).
STREET SWEEPING MACHINE.
APPLICATION FILED JULY 17, 1901.
NO MODEL. 6 SHEETS—SHEET 5.

No. 762,241. PATENTED JUNE 7, 1904.
H. D. LAYMAN & FLORENCE W. PARPART, (BY MARRIAGE NOW FLORENCE W. LAYMAN).
STREET SWEEPING MACHINE.
APPLICATION FILED JULY 17, 1901.
NO MODEL. 6 SHEETS—SHEET 6.

No. 762,241. Patented June 7, 1904.

UNITED STATES PATENT OFFICE.

HIRAM D. LAYMAN AND FLORENCE W. PARPART, (BY MARRIAGE NOW FLORENCE W. LAYMAN,) OF NEW YORK, N. Y.

STREET-SWEEPING MACHINE.

SPECIFICATION forming part of Letters Patent No. 762,241, dated June 7, 1904.

Application filed July 17, 1901. Serial No. 68,621. (No model.)

*To all whom it may concern:*

Be it known that we, HIRAM D. LAYMAN and FLORENCE W. PARPART, citizens of the United States, residing at New York, in the county of New York and State of New York, have invented new and useful Improvements in Street-Sweeping Machines, of which the following is a specification.

This invention relates to street-sweepers, and among the main objects in view are to produce a comparatively light-draft machine of this class that is adapted to efficiently gather dirt from the street-surface regardless of inequalities and subsequent to a light sprinkling of the same brush the dirt so gathered upon an elevator and finally deliver said dirt to a receptacle, where it is evenly distributed preliminary to a discharge into waiting carts; to adapt such machine to carry on the several steps of its entire operation under cover, and therefore avoid escaping dust, germs, and dirt; to provide for ready adjustments of the sweeping and dirt-receiving mechanisms, and finally to have the machine under ready control of the driver or operator while mounted on the usual seat at the front of the machine.

Various other objects and advantages of the invention will hereinafter appear, and the novel features thereof will be particularly pointed out in the claims.

Referring to the drawings.

Like characters of reference indicate like parts in all the figures of the drawings.

Upon a suitable running-gear, comprising the usual front wheels 1 and rear wheels 2, is supported on sills (hereinafter referred to) the wagon or body portion 4. The wagon or body portion may be, and preferably is, subdivided longitudinally, forming an upper and a lower compartment, (designated as 5 and 6, respectively.) The upper compartment is the dirt-receptacle and in the present instance is provided at one side with a downwardly and outwardly swinging door 7, hinged at its lower edge, as at 3, whereby when lowered it may serve as a chute. The lower compartment forms the water compartment or tank, which may be filled in the usual manner from any of the city water-plugs. It may be provided at its front with a suitably-covered manhole $6^a$, through which access may be had to its interior. Aside from these features and the water-discharge, hereinafter referred to, a seat 8 is provided for the driver, adjacent to which the various levers, &c., are arranged for controlling the sweeping, dirt-receiving, dumping, sprinkling, and clutch mechanisms.

Figure 2:
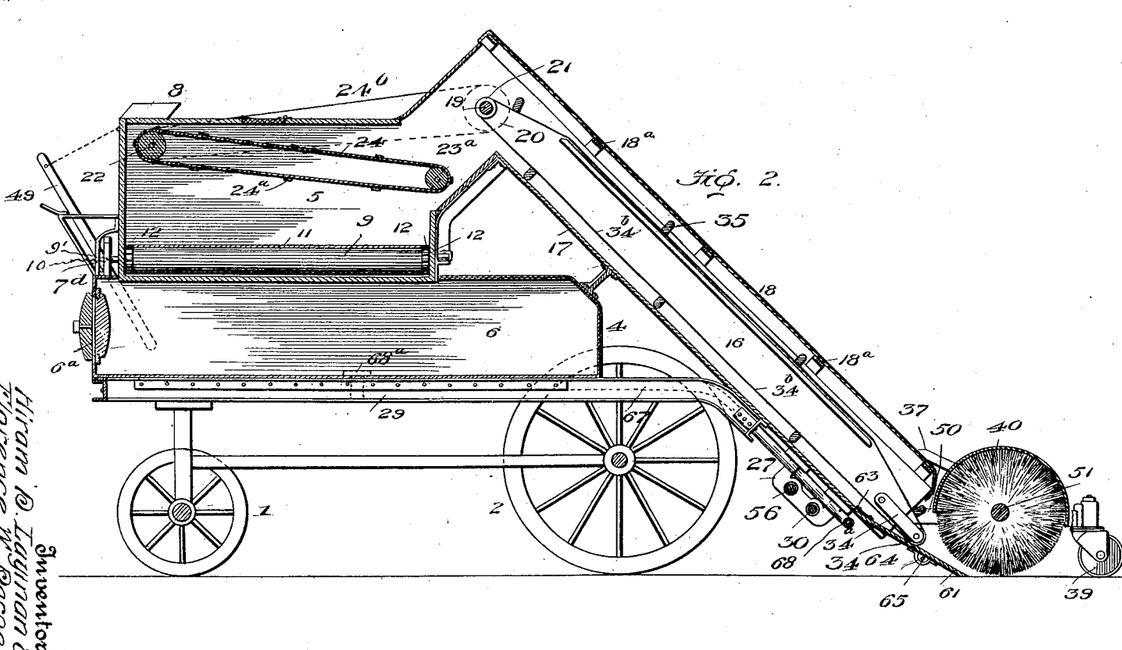
Fig. 2 is a longitudinal sectional view through the center of the same.
Figure 3:
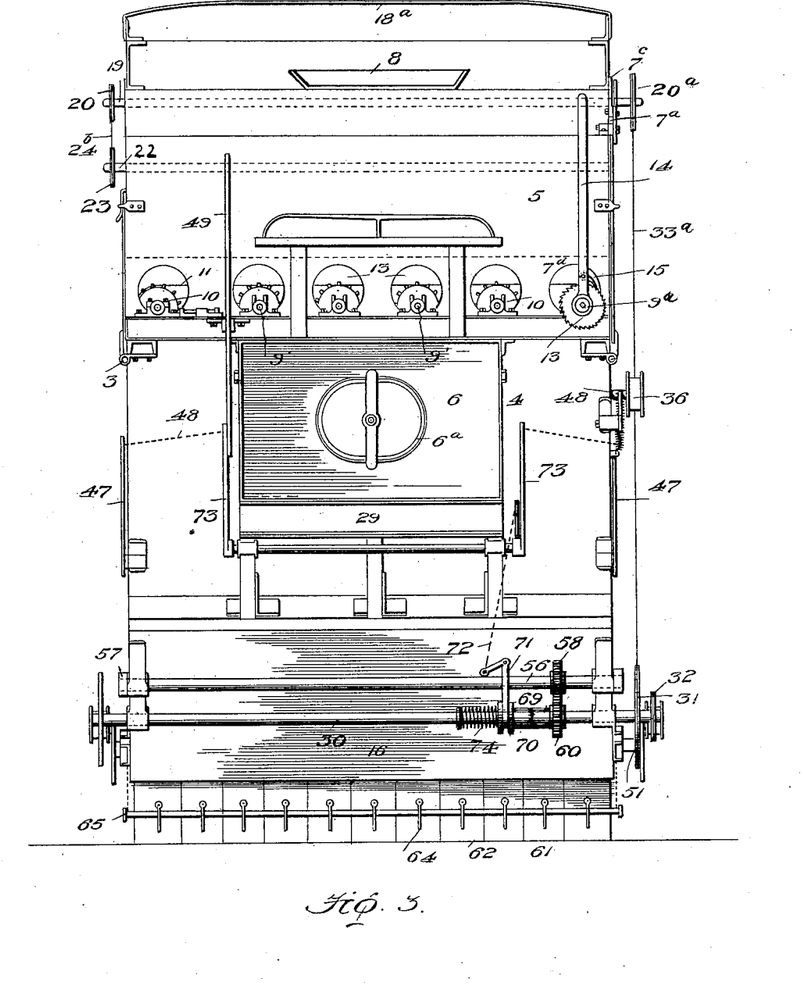
Fig. 3 is a front elevation or end view of the machine with the protecting-plate for the shaft-bearings removed.
Figure 4:
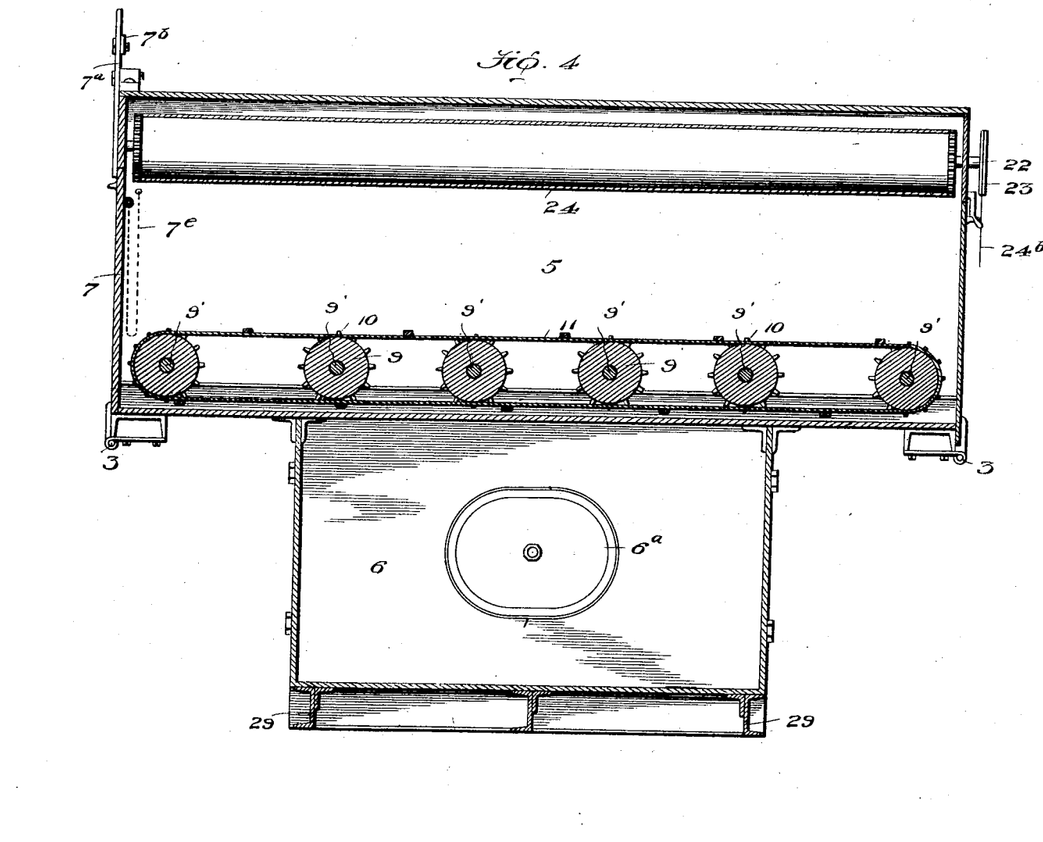
Fig. 4 is a transverse vertical sectional view looking from the rear.
Figure 5:
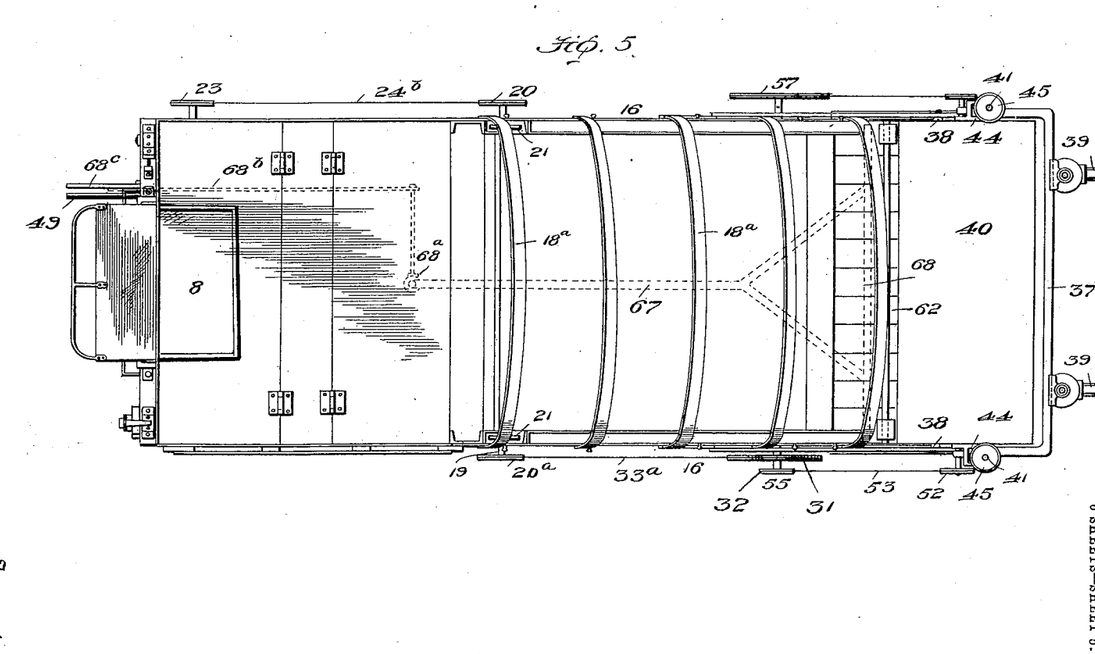
Fig. 5 is a top plan view with the canvas cover and elevator mechanism removed.

In the bottom of the upper or dirt receptacle 5 and journaled in the ends thereof is a series of parallel shafts 9', the same carrying rolls 9, having mounted thereon at opposite ends sprocket-wheels 10. An endless transversely-movable apron 11, upon which cleats are located at intervals, is secured to sprocket-chains 12, that pass over the said sprocket-wheels, so that, as will be obvious, the shafts and apron move together in a direction transverse the receptacle. The front end $9^a$ of one of these end shafts 9' extends beyond its bearing and the front wall of the wagon, at which point it has mounted thereon a ratchet-wheel 13. A hand-lever 14 is loosely mounted on said shaft adjacent said ratchet-wheel, and a loose gravity-pawl 15, carried by the hand-lever, engages the teeth of said ratchet-wheel. It is obvious that the driver or operator while mounted upon his seat may grasp and vibrate the hand-lever 14, and the swinging door being lowered the dirt or sweepings will be directed to the same by the thus operated or fed discharge-apron, the door serving as an inclined chute down which the accumulated dirt or sweepings will be directed into the waiting adjacent cart. A plate 7$^d$ (see Fig. 2) may be employed to cover the front ends of the shafts 9 and their bearings, and said plate being removable access to the bearings for lubricating and other purposes is obtainable.

As before stated, the door is hinged at its lower edge and may, if desired, be limited in its downward swing by a pair of chains 7$^e$. When elevated, the door may be locked by any suitable means, but preferably by a series of bell-cranks 7$^a$, fulcrumed on the side of the wagon-body and all connected to move in unison by a bar 7$^b$, the front end of which is connected to a hand-lever 7$^c$, conveniently located adjacent to the driver.

Declining from the rear of and suitably supported upon the wagon-body is an elevator-frame comprising, in the present instance, the two opposite sides 16, a longitudinally-inclined connecting bottom 17, and a removable, preferably canvas, covering 18, for the support of which latter arched bails 18$^a$ are provided. Journaled in the upper ends of the sides 16 is a transverse shaft 19, the same having its ends extended beyond their bearings and provided with fixed pulleys 20 20$^a$. Said shaft is also provided with two fixed pulleys 21, arranged intermediate of said former pulleys.

At the front end of the dirt-receptacle a transverse shaft 22 is located, one end of which projects beyond its bearing and carries at that point a fixed sprocket-wheel 23. In the rear upper end of the dirt-receptacle a companion roll or shaft 23$^a$ is journaled, the same being located below the upper transverse shaft of the elevator. The shafts 22 and 23$^a$ are connected by a pair of suitable belts 24, the same being connected at intervals by transverse flights 24$^a$, the said belts receiving motion from the rolls upon which they are mounted, the forward roll being driven through the medium of a belt 24$^b$, which connects the pulley 23 with the pulley 20 of the elevator. It will be obvious that dirt or sweepings delivered from the upper end of the elevator into the receptacle will after rising to a certain point be carried forward by said flights 24$^a$, and thus leveled or distributed evenly instead of being allowed to accumulate at the delivery-point—namely, the rear end of the dirt-receptacle.

The wagon-body, as stated, is supported upon a pair of longitudinal sills 29, the latter being preferably curved downwardly at their rear ends and securely bolted to the lower end of the elevator-frame, whereby the latter is rigidly supported.

Universally journaled in the lower end of the elevator-frame, preferably in yokes 27, is a transverse main shaft 30, one end of which is provided with a pulley 31 and a smaller pulley 32, the latter being connected by a belt 33$^a$ with the pulley 20$^a$ of the shaft 19 in the upper end of the elevator-frame, whereby the said shaft is driven. A pair of guide-rollers 34 are mounted upon studs extending from the lower ends of a pair of loose swinging brackets 34$^a$, which latter are pivotally connected at their upper ends to the opposite sides of the elevator-frame. A pair of belts 34$^b$ pass over the intermediate sprocket-wheels of the shaft 19 and also over and around the rollers 34, and such belts are connected at intervals, and therefore support, so as to move over and scrape upon the bottom of the elevator, a series of cross-flights 35, which are adapted to elevate the dirt or sweepings as they are collected and delivered to the lower end of the elevator. A belt-tightener 36, of the ordinary type, is located against the sprocket-chain 33$^a$, and, in fact, such "tighteners," so designated, may be located at any point where their functions are desired.

Supported by and located within a U-shaped bail or frame 37 and immediately in rear of the elevator is a half-round hood 40. The U-shaped bail or frame 37 is pivoted, as at 38, on the ends of the hood, the rear end of said bail being supported upon a pair of swiveled casters 39, which serve as fulcrums when the front of the bail is elevated. This hood is connected at its opposite ends to the terminals of the bail or frame back of its pivot-points 38 in some simple manner that will permit of vertical adjustment of the hood. In the present instance a pair of rods 41 are employed for this purpose. These rods have eyes 42 at their lower ends designed to engage studs 43, that project from the bail-terminals. The upper ends of the rods are threaded and pass loosely through brackets 44, in which latter are seated hand-wheels or nuts 45, that receive the upper threaded ends of the rods and work upon the same. As will be obvious, the hood 40 may be adjusted with relation to the bail by this simple mechanism, and thus the hood maintained in proper relation to the brush-roll hereinafter described.

Beyond the points of pivot between the ends of the hood 40 and the terminals of the bail or frame the ends of the terminals of the bail or frame are by short chains 46 connected to opposite bell-crank levers 47, fulcrumed on the opposite sides of the elevator. Chains 48 lead from the forward ends of these bell-cranks to a suitable hand-lever 49, located at one side of, and therefore readily accessible to, the driver, so that the bail or frame, the hood, and all mechanism carried thereby or connected thereto may be readily elevated or lowered without the necessity of the driver leaving his seat and by the use of the single lever.

Figures 8, 9, 10, 11, 12:
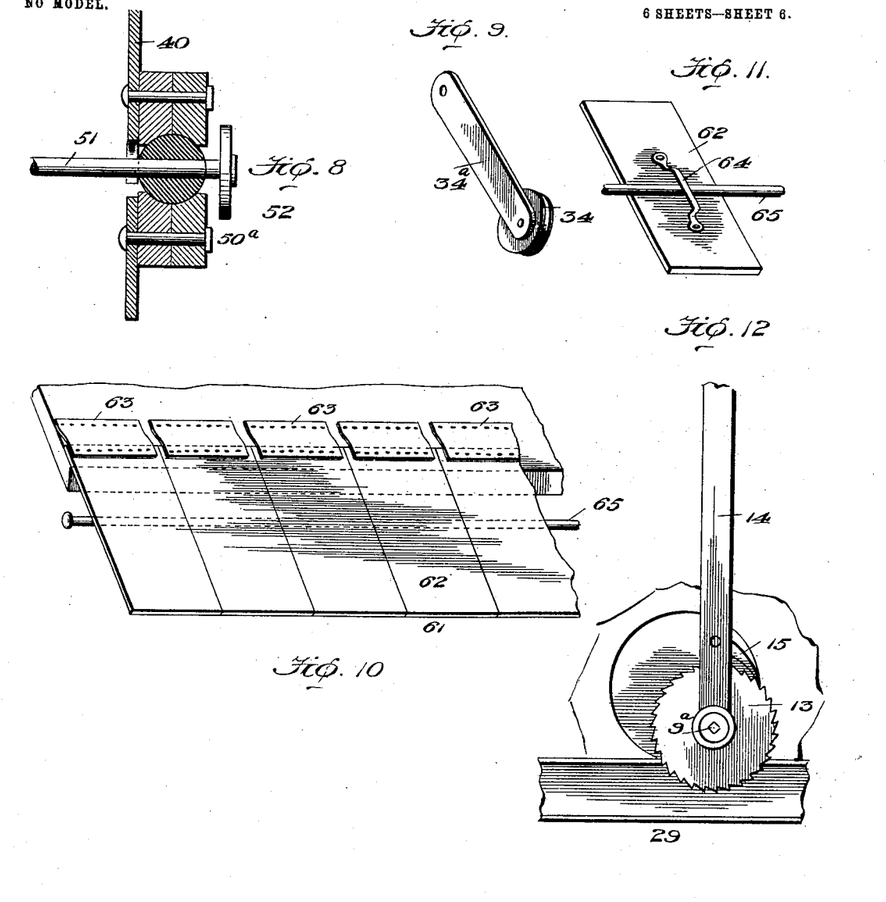
Fig. 8 is a sectional view showing the end bearing of the brush roll or shaft.
Fig. 9 is a detail in perspective of one of the swinging bearing-brackets employed at the lower end of the elevator.
Fig. 10 is a detail in perspective of a series of the apron-sections, the view being taken from the rear and illustrating their mode of connection with the lower end of the elevator.
Fig. 11 is a detail of one of the apron-sections, the view being taken from the under side.
Fig. 12 is a front elevation of the lever for operating the transverse discharge-apron.

A pair of bearing-bars 50 are loosely pivoted to the opposite sides of the elevator and at their rear ends are secured to and extend at opposite sides of the hood 40 immedietely below the bail or frame. Said bearing-bars are provided with a series of holes *a*, whereby they may be adjusted longitudinally with relation to the elevator. Journaled in preferably universal bearings 50ª, formed in these bars, (see Fig. 8,) is a brush-shaft 51, the same being under cover of the hood 40, the ends of the latter being provided with openings for the accommodation of said shaft. One end of the brush-shaft extends beyond its bearing and is there provided with a pulley 52, a belt 53 leading from the same to the driving-pulley 31 of the main shaft. Any ordinary belt-tightener 54 may be mounted between the two sprockets.

The rear wheel 2 is utilized as the driver or driving-wheel, and upon the hub of the same is mounted a pulley 55. A counter-shaft 56 is universally journaled in rear thereof in the yoke-bearing before mentioned, and upon this shaft is mounted a pulley 57 and a spur-gear 58, the former being connected by a belt 59 with the pulley 55 of the drive-wheel and the spur-gear meshing with the companion-gear 60, located on the main drive-shaft 30, whereby a proper direction of motion is given the said main shaft. It will be observed that motion is imparted to the counter-shaft 56 by means of belt 59 and transmitted to shaft 30 through gears 58 and 60. The pulley 31 on shaft 30 transmits motion to the brush, and pulley 32 transmits motion to the elevator-flights through the medium of shaft 19 and pulleys 20ª and 21.

The inclined apron or pan 61, up which the dirt or sweepings is swept by the brush to the elevator, preferably comprises a series of independently-movable sections 62, the series being flexibly connected or hinged at their upper ends to and overlapping the lower end of the elevator-bottom by means of leather hinges 63. The under side of each section is provided with an eye or loop 64, a lifting-rod 65 passing loosely through such eyes or loops of the entire series. The ends of the rod extend beyond the gang of pans or apron and are connected by short lift-chains 66 to the bearing-bars, so that a raising of the bail will also serve to raise the brush and bearing-bars and the said gang of sections.

By the construction shown the brush can drop into and clean a depression in the street; so, also, can the sections of said apron or pan rise and fall, either *en masse* or singly or in series, to yield to obstructions and depressions.

A water-discharge pipe 67 leads from the bottom of the reservoir or tank to a transversely-disposed sprinkling-pipe 68, located in advance of the pans, the supply being regulated by a cock 68ª, operated by a connecting-rod 68ᵇ, connected thereto and to a foot-lever 68ᶜ at one side of the seat for the driver.

The spur-gear 60 of the main shaft 30 has a toothed hub 69, the said gear being loose on the shaft. At one side thereof there is splined on the same shaft a clutch-sleeve 70, designed to be thrown out of operative connection with the said hub. This clutch mechanism may be operated in any desired manner; but for the purpose of simplifying the labor of the driver it is preferred to employ a bell-crank lever 71, which is pivoted under the body of the wagon. One end of the bell-crank lever is loosely connected with the sliding clutch-sleeve, while the other end is, by a chain or cable 72, connected to one branch of an intermediate bell-crank 73, located at the side of the wagon and connected at its remaining end to the chain for lifting the hood, brush, apron, or pan, &c. A coiled spring 74 serves to normally connect the clutch-sleeve with the toothed hub of the spur-gear. It will be apparent that the single operation of the hand-lever by the driver stops the operation of the machine, as well as elevates the mechanism just referred to.

Figures 1, 6, 7:
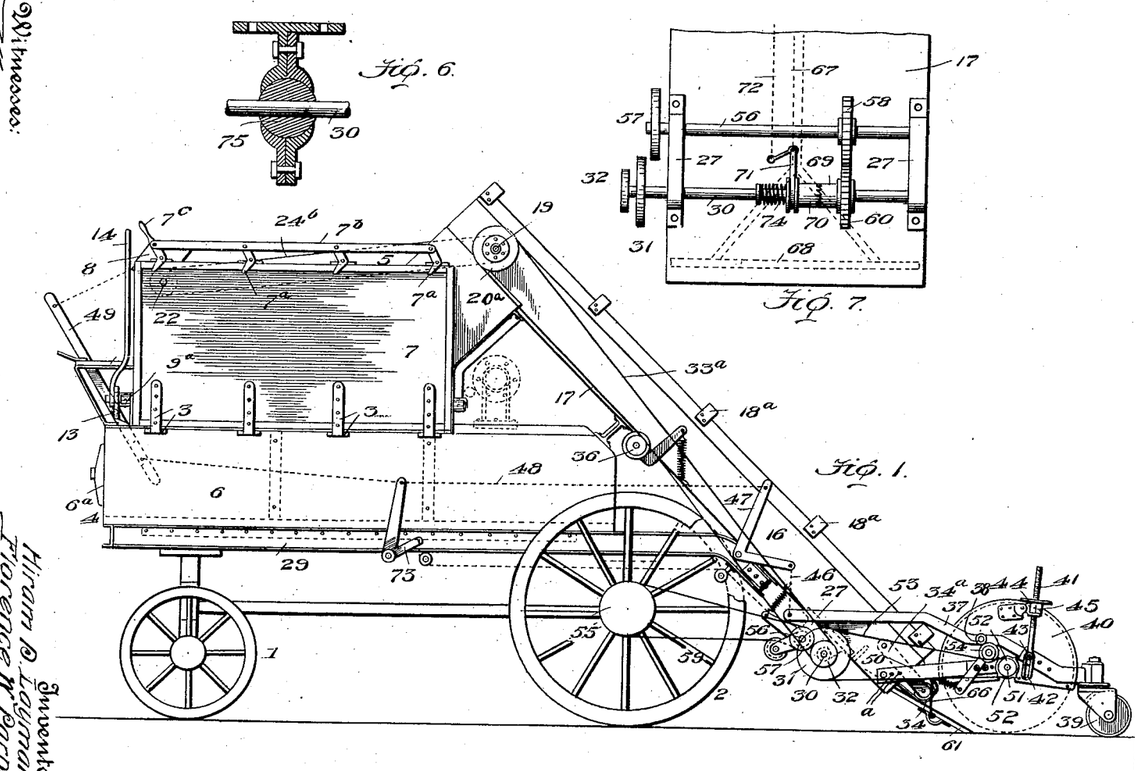
Figure 1 is a side elevation of a street-sweeping machine embodying the invention.
Fig. 6 is a detail in section of the bearing employed in the counter and main shafts.
Fig. 7 is a bottom plan of a portion of the elevator, illustrating the driving and clutch-shifting mechanism.

The counter and main drive shafts are, as before stated, preferably mounted in a pair of bearing-yokes, and the bearing-openings therein, like those for the support of the brush, are, as shown in Fig. 6, concaved to receive spherical or round balls 75, which are bored radially for the shafts.

The apparatus in practice careens as it meets with obstructions or drops into depressions in the roadway, and for this reason it has been found necessary to provide a loose journal for each and all of the shafts that would otherwise be subjected to strains. Of course any well-known construction of loose shaft connection and bearings may be substituted for those shown, if preferred.

From the foregoing it will be apparent that we secure the several objects of our invention in that we produce a light-draft machine of simple construction that will sprinkle, sweep, and clean a street-surface in a most efficient manner, that is readily controlled and operated by the driver while seated on the seat provided for him and while handling his team, and all without the scattering of dust, dirt, and disease germs.

Various changes may be made in our invention as regards the details of construction, and we therefore do not limit the invention to the exact details herein shown and described, but maintain that such ordinary changes are all comprehended in our invention without specific mention.

What we claim is—

1. In combination, in a street-sweeping machine, a body portion having a side discharge, and means for elevating and discharging dirt in said body portion, a series of longitudinally-disposed rolls, bearings and journals therefor, an endless apron arranged upon the rolls, a lever loosely mounted on the journal of one of the rolls, a pawl carried by the lever, and a ratchet-wheel mounted on said journal and adapted to be operated by the vibrations of said lever.

2. In combination, in a street-sweeping machine, a body portion having a dirt-receptacle provided with a lateral side discharge, an endless apron located on the bottom thereof, and means for feeding the same toward the discharge, an elevating mechanism discharging into the receptacle, endless belts supported above the apron and provided with transverse flights, and means for continuously operating the same.

3. A street-sweeping machine comprising a body portion having a dirt-receptacle, a pair of sills for supporting said body portion and having downwardly-curved ends, brackets secured to said body portion and dirt-receptacle in line with the curved ends of said sills, and an elevator-frame supported by said curved ends and said brackets.

4. A street-sweeping machine comprising a body portion, a bail or frame having casters, a hood carried thereby, pivoted bearing-bars also connected to said hood, a brush mounted in said bars, an apron, connections between the same and said bearing-bars, and means for raising the forward ends of said bail or frame whereby said brush and apron are raised simultaneously therewith.

5. A street-sweeping machine comprising a body portion, a bail or frame having casters, a hood carried thereby, pivoted bearing-bars also connected to said hood, a brush mounted in said bars, an apron composed of a series of flexibly-mounted sections, a rod passed thereunder, chains connecting said rod and said bearing-bars, and means for raising the forward ends of said bail or frame whereby said brush and rod are simultaneously elevated therewith.

6. A street-sweeping machine comprising a body portion, a bail or frame having casters, a hood carried thereby, pivoted bearing-bars also connected to said hood, means for adjusting said bearing-bars longitudinally, a brush mounted in said bearing-bars, and a pan or apron connected to said body portion.

7. In combination, in a street-sweeping machine, a U-shaped bail provided at its rear end with casters adapted to serve as fulcrums, a sweeping mechanism connected to the bail, and means for elevating the front ends or terminals of the bail.

8. In combination, in a street-sweeping machine, a body portion, a U-shaped bail or frame, casters supporting the rear end thereof and adapted to serve as fulcrums, a pair of frame-bars pivoted to the machine and located below the bail or frame and loosely connected thereto at their rear ends, a brush carried by the said bars, bell-cranks pivoted on the body portion, a lever fulcrumed on the body portion, and chains connecting the lever with the bell-cranks and the latter with the front terminals of the bail or frame.

9. In combination, in a street-sweeping machine, a body portion, a U-shaped bail or frame, casters supporting the rear end thereof and adapted to serve as fulcrums, a pair of frame-bars pivoted to the machine and located below the bail or frame and loosely connected thereto at their rear ends, a brush carried by said bars, bell-cranks pivoted on the body portion, a lever fulcrumed on the body portion, an apron loosely supported below the bars, chains connecting the bars and shovels, and chains between the lever and bell-cranks and between the latter and the front ends of the bail.

10. In combination, in a street-sweeping machine, a body portion, a rear bail or frame, casters supporting the rear end thereof and adapted to serve as fulcrums, a hood surmounting the bail, a lever, connections between the same and the front terminals of the bail, and a brush mechanism adapted to be elevated by the bail.

11. In combination in a street-sweeping machine, a body portion, a rear bail or frame having projecting studs, casters supporting said bail or frame, a hood carried by said bail or frame and having brackets, threaded rods passed through said brackets and having eyes engaging said studs, and nuts working on said rods.

12. In combination in a street-sweeping machine, a body portion comprising a dirt-receptacle, an elevator-frame, an elevator carried by said frame and leading to said dirt-receptacle, an apron pivoted to the lower end of said elevator-frame, a rod passed thereunder, a brush mechanism, supports therefor also mounted on said elevator-frame, connections between said rods and said supports, and means for raising and lowering said supports.

13. In combination, in a street-sweeping machine, an elevator-frame, a shaft carrying sprocket-wheels journaled at the upper end thereof, a pair of loosely-supported guide-rollers at the lower end of the elevator-frame, a pair of sprocket-chains passing over the sprocket-wheels and rollers, intermediate guides for the chains, flights connecting said chains, and means for driving the upper shaft.

14. In combination, in a street-sweeping machine, an elevator-frame, a shaft having sprocket-wheels journaled at the upper end thereof, a pair of loosely-hung brackets provided with guide-rollers in the lower end of the elevator-frame, intermediate guide-cleats, sprocket-chains passed over the rollers, sprocket-wheels and guides, and means for giving motion to the chains.

15. In a street-sweeping machine, a body portion, a sweeping mechanism, a swinging support therefor, a main shaft arranged to operate said sweeping mechanism, means for rotating said main shaft, a clutch on said main shaft, an operating-lever therefor, a lever pivoted to said body portion, a chain running therefrom to said swinging support, a bell-crank lever also pivoted to said body portion and having one member connected to said chain, and a second chain running from the other member of said bell-crank lever to said clutch-lever.

16. In a street-sweeping machine, a body portion provided with a dirt-receptacle, an elevator emptying therein, a sweeping mechanism, a main shaft arranged to operate said sweeping mechanism, means for rotating said main shaft, a clutch on said shaft, an operating-lever therefor, means for raising said sweeping mechanism, and a bell-crank lever having connection with the operating-lever of said clutch and also with said raising means.

17. In a street-sweeping machine, a body portion, a sweeping mechanism, a swinging support therefor, a pivotally-supported apron, connections between the same and said sweeping mechanism, a main shaft arranged to operate said sweeping mechanism, means for rotating said shaft, a clutch on said shaft, an operating-lever therefor, means for raising said sweeping mechanism and said apron, and a bell-crank lever having connection with the operating-lever of said clutch and also with said raising means.

18. In a street-sweeping machine, the combination of a brush, a pan to receive sweepings from the brush, a closed receptacle for the sweepings, elevating-buckets to carry the sweepings from the pan and discharge them into one end of the receptacle, a movable endless leveling device in the upper portion of the receptacle to move the sweepings toward the other end of the receptacle, means for moving the buckets, and means for moving the leveling device, substantially as set forth.

In testimony whereof we affix our signatures in presence of two witnesses.

HIRAM D. LAYMAN.
FLORENCE W. PARPART.

Witnesses:
W. S. DUVALL,
GRAFTON L. McGILL.